(12) United States Patent
Park et al.

(10) Patent No.: US 8,278,596 B2
(45) Date of Patent: Oct. 2, 2012

(54) APPARATUS FOR FORMING PATTERN USING LASER

(75) Inventors: Deukil Park, Pyeongtaek-si (KR); Choongyop Rhew, Pyeongtaek-si (KR); Daisoung Park, Pyeongtaek-si (KR); Wonmyeong Kang, Pyeongtaek-si (KR)

(73) Assignee: LS Tech Co., Ltd., Gyeonggi-Do (KR)

( * ) Notice: Subject to any disclaimer, the term of this patent is extended or adjusted under 35 U.S.C. 154(b) by 266 days.

(21) Appl. No.: 12/834,143

(22) Filed: Jul. 12, 2010

(65) Prior Publication Data

US 2011/0006043 A1  Jan. 13, 2011

(30) Foreign Application Priority Data

Jul. 10, 2009 (KR) .................. 10-2009-0062799

(51) Int. Cl.
*B23K 26/08* (2006.01)
*B23K 26/00* (2006.01)

(52) U.S. Cl. .................................................. 219/121.8

(58) Field of Classification Search ............... 219/121.8; 362/623, 330, 31, 26, 27; 264/400, 482, 264/40.1, 121.62, 121.66, 69, 121.8, 121.81, 264/121.85; 425/174.4
See application file for complete search history.

(56) References Cited

U.S. PATENT DOCUMENTS

| | | | | |
|---|---|---|---|---|
| 5,375,043 A | * | 12/1994 | Tokunaga | 362/601 |
| 5,420,761 A | * | 5/1995 | DuNah et al. | 362/623 |
| 5,779,338 A | * | 7/1998 | Ishikawa et al. | 362/625 |
| 6,548,009 B1 | * | 4/2003 | Khlif et al. | 264/400 |
| 7,524,210 B2 | * | 4/2009 | Lee et al. | 439/620.02 |
| 8,122,846 B2 | * | 2/2012 | Stiblert et al. | 118/300 |

FOREIGN PATENT DOCUMENTS

| | | |
|---|---|---|
| KR | 10-1998-0008596 | 9/1998 |
| KR | 10-2000-0075525 | 3/2001 |
| KR | 10-2002-0028919 | 8/2002 |
| KR | 10-2001-0025870 | 11/2002 |
| KR | 20-2003-0016501 | 8/2003 |
| KR | 10-2002-0026023 | 11/2003 |
| KR | 10-2004-0029372 | 6/2004 |
| KR | 10-2005-0010952 | 5/2006 |
| KR | 10-2005-0057719 | 5/2006 |
| KR | 10-2005-0012612 | 8/2006 |
| KR | 10-2006-0049742 | 12/2007 |
| KR | 10-2007-0079064 | 11/2008 |

* cited by examiner

*Primary Examiner* — Dao H Nguyen
*Assistant Examiner* — Tram H Nguyen
(74) *Attorney, Agent, or Firm* — IPLA P.A.; James E. Bame

(57) ABSTRACT

An apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape. The controller transmits position signal of the light guide patterns to the X-Y driver and simultaneously, transmits a switching signal to the laser oscillating unit. The laser oscillating unit outputs a laser beam synchronized with a movement of the header unit. The X-Y driver moves the header unit and the stage. The header unit moves along a first guide rail. The stage moves along a fixed second guide rail in the front and rear direction of the light guide panel.

12 Claims, 4 Drawing Sheets

APPARATUS FOR FORMING PATTERN USING LASER

CROSS REFERENCE

This application claims foreign priority under Paris Convention and 35 U.S.C. §119 to Korean Patent Application No. 10-2009-0062799, filed Jul. 10, 2009 with the Korean Intellectual Property Office.

BACKGROUND OF THE INVENTION

1. Technical Field

The present invention relates to manufacturing a pattern of a light guide panel of a surface light source device used in a liquid crystal display device, a lighting signboard, a cellular phone, a telephone, a Personal Digital Assistant (PDA), a keyboard, an electronic calculator, etc. More particularly, the present invention relates to an apparatus for forming a pattern using a laser, for equalizing an output of waving laser and securing the uniformity of light guide patterns, by splitting and forming the light guide patterns through many times.

2. Description of the Related Art

Commonly, a light guide panel, which is a plate for providing a path for uniformly scattering and diffusing light scanned from a light source, is being applied to a light receiving flat display device such as a liquid crystal display device, or a surface light source device used in a lighting signboard, etc.

FIG. 1 is a cross section schematically illustrating a conventional surface light source device.

Referring to FIG. 1, the conventional surface light source device 10 includes a light guide panel 11, a reflective sheet 12 installed below the light guide panel 11, a light source 13 installed at one side of the light guide panel 11, and a cover member 14 covering the light source 13. As the light source 13, a cold cathode fluorescent lamp, a Light Emitting Diode (LED), etc. can be used. In the light guide panel 11, a plurality of light guide patterns 15 are formed by using a bead-shaped Oxide Titanium ($TiO_2$) and ink including glass, acryl, etc. to scatter and diffuse light incident on one surface of a transparent acrylic resin. In the surface light source device 10, light irradiated from the light source 13 is incident on the light guide panel 11, and the incident light is guided through the light guide panel 11 as indicated by arrows. After that, the guided light is reflected at relatively uniform illumination in each part by the reflective sheet 12 and the light guide patterns 15. After that, the reflected light passes through a diffuse sheet 16 and again passes through a prism sheet 17 to direct toward the front.

As a method for forming the light guide patterns 15 of the light guide panel 11, there is a method using a Carbon Dioxide ($CO_2$) laser. However, the Carbon Dioxide ($CO_2$) laser has a deviation because of its inconstant output. This leads to a problem of not being capable of guaranteeing the uniformity of the light guide patterns 15 formed in the light guide panel 11.

Also, position and length information on each light guide pattern 15 to be formed in the light guide panel 11 are generally previously stored in a pattern storing module (not shown), and this information is read out from the pattern storing module (not shown) to form the light guide patterns 15. In this case, there is a problem of the occurrence of an exterior warp phenomenon in which it is seen that the light guide patterns 15 formed in the light guide panel 11 are seemingly curved or warped along their edges due to several main causes.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus for forming a pattern using a laser, for equalizing an output of waving laser and securing the uniformity of light guide patterns manufactured through this.

Another aspect of exemplary embodiments of the present invention is to provide an apparatus for forming a pattern using a laser, for improving the productivity of light guide patterns.

A further aspect of exemplary embodiments of the present invention is to provide an apparatus for forming a pattern using a laser, for eliminating an exterior warp phenomenon occurring in light guide patterns.

According to one aspect of the present invention, an apparatus for forming a pattern using a laser is provided. The apparatus includes a pattern storing unit, a controller, a laser oscillating unit, an X-Y driver, a header unit, and a stage. The pattern storing unit stores data on light guide patterns of a discontinuous straight line shape to be formed in a light guide panel. The controller reads out position signals of the light guide patterns to be formed in the light guide panel from the pattern storing unit and transmits the read-out position signal to the X-Y driver and simultaneously, transmits a switching signal, which is generated on the basis of length information of the light guide patterns, to the laser oscillating unit. The laser oscillating unit outputs a laser beam synchronized with a movement of the header unit, on the basis of the switching signal received from the controller. The X-Y driver moves the header unit and the stage on the basis of the position signal received from the controller. The header unit moves along a first guide rail in the left and right direction of the light guide panel by way of the X-Y driver, and forms the light guide patterns in the light guide panel by vertically downwardly reflecting and concentrating the laser beam output from the laser oscillating unit. The stage moves along a fixed second guide rail in the front and rear direction of the light guide panel by way of the X-Y driver, and fixes the light guide panel. The light guide patterns are split and formed through many times by means of reciprocation of the stage.

The stage is a stage capable of fixing a plurality of light guide panels.

The controller varies a start point of formation of the light guide pattern, by adding an arbitrary random value of 5 μm to 100 μm to an X coordinate of the position signal read out from the pattern storing unit, for each of the light guide patterns to be formed in the light guide panel.

The controller varies a length of the light guide pattern, by adding an arbitrary random value of 5 μm to 100 μm to the length information read out from the pattern storing unit, for each of the light guide patterns to be formed in the light guide panel.

In case that the number of times of reciprocation is equal to '1', the header unit splits and forms light guide patterns in the way of forming light guide patterns for a light guide pattern line (2N+1(N=0, 1, 2, 3, . . . )) as the stage moves to the front and forming light guide patterns for a light guide pattern line (2N+2(N=0, 1, 2, 3, . . . )) as the stage returns to the rear.

In case that the number of times of reciprocation is equal to '1.5', the header unit splits and forms light guide patterns in the way of forming light guide patterns for a light guide pattern line (3N+1(N=0, 1, 2, 3, . . . )) as the stage moves to the front, forming light guide patterns for a light guide pattern line (3N+2(N=0, 1, 2, 3, . . . )) as the stage returns to the rear, and forming light guide patterns for a light guide pattern line (3N+3(N=0, 1, 2, 3, . . . )) as the stage again moves to the front.

In case that the number of times of reciprocation is equal to '2', the header unit forms light guide patterns in the way of forming light guide patterns for a light guide pattern line (4N+1(N=0, 1, 2, 3, . . . )) as the stage moves to the front, forming light guide patterns for a light guide pattern line (4N+2(N=0, 1, 2, 3, . . . )) as the stage returns to the rear, form light guide patterns for a light guide pattern line (4N+3(N=0, 1, 2, 3, . . . )) as the stage again moves to the front, and forming light guide patterns for a light guide pattern line (4N+4(N=0, 1, 2, 3, . . . )) as the stage again returns to the rear.

BRIEF DESCRIPTION OF THE DRAWINGS

The above and other objects, features and advantages of the present invention will become more apparent from the following detailed description when taken in conjunction with the accompanying drawings in which.

Throughout the drawings, the same drawing reference numerals will be understood to refer to the same elements, features and structures.

DESCRIPTION OF SPECIFIC EMBODIMENTS

Exemplary embodiments of the present invention will now be described in detail with reference to the annexed drawings. In the following description, a detailed description of known functions and configurations incorporated herein has been omitted for conciseness.

Figure 1:
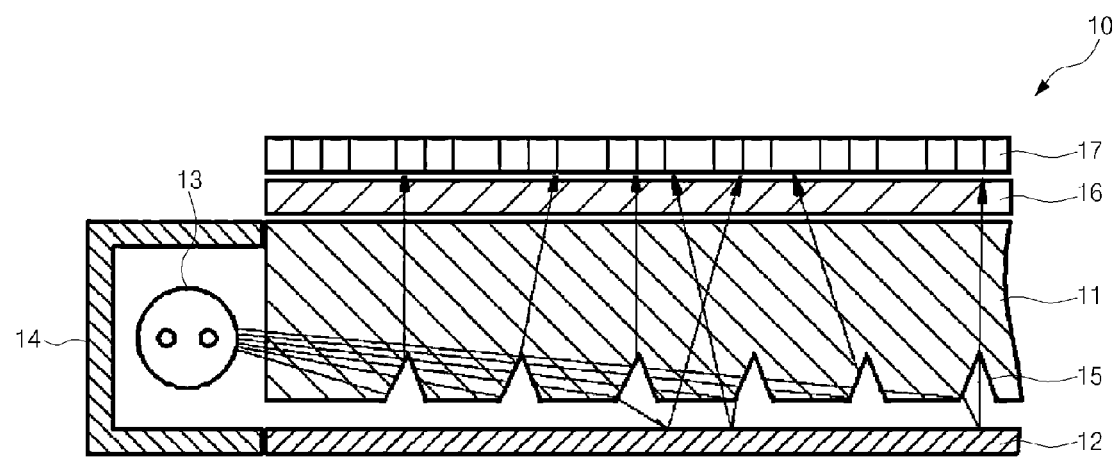
FIG. 1 is a diagram illustrating a conventional surface light source device.
Figure 2:
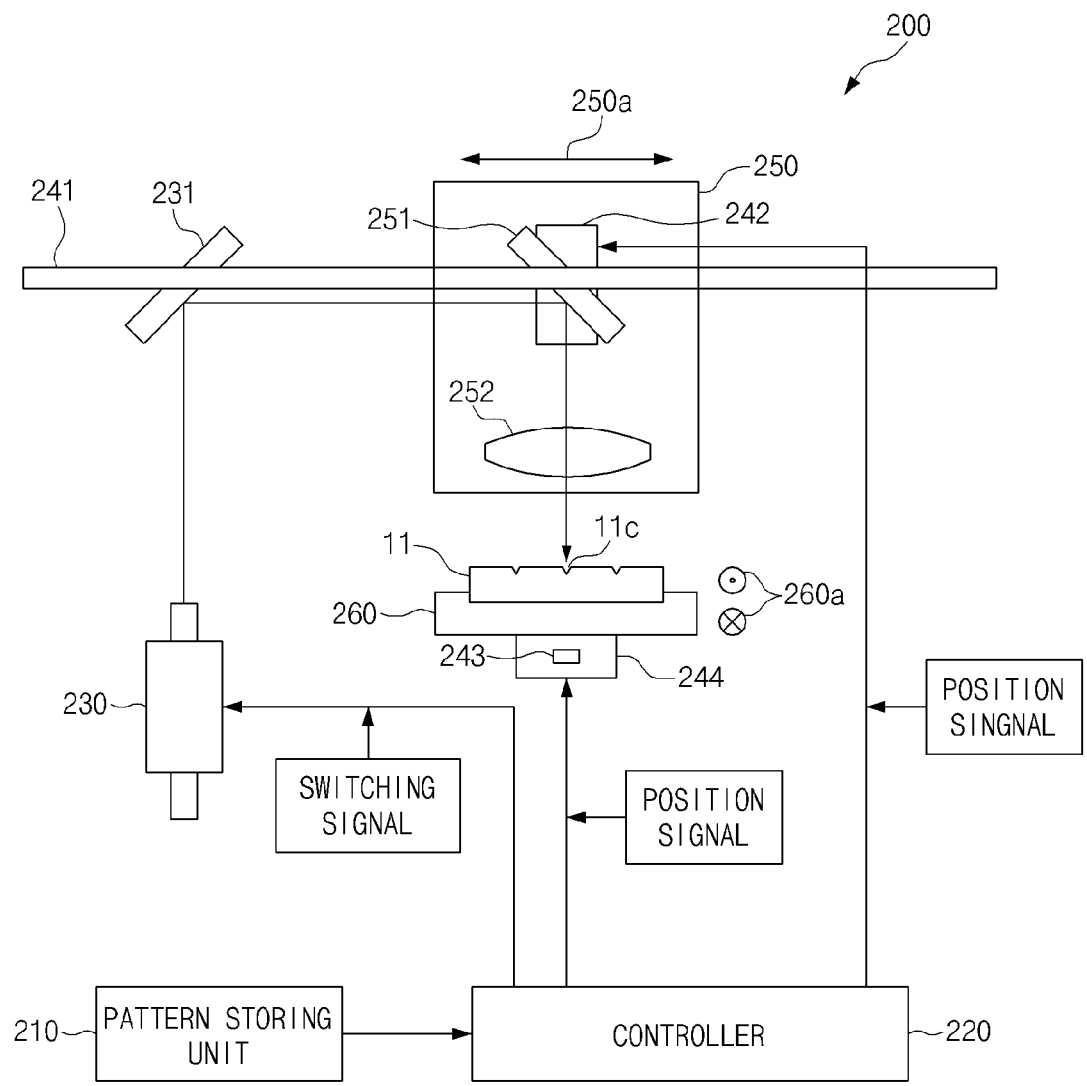
FIG. 2 is a diagram illustrating the whole construction of an apparatus for forming a pattern using a laser according to an exemplary embodiment of the present invention.

FIG. 2 is a diagram illustrating the whole construction of an apparatus for forming a pattern using a laser according to an exemplary embodiment of the present invention. The apparatus 200 includes a pattern storing unit 210, a controller 220, a laser oscillating unit 230, an X driver (i.e., a first driver) 242, a Y driver (i.e., a second driver) 244, a header unit 250, and a stage 260.

Referring to FIG. 2, the pattern storing unit 210 stores data on light guide patterns 11c of a discontinuous straight line shape to be formed in a light guide panel 11. In detail, the light guide patterns data can include position signal (i.e., X and Y coordinates) and length information on each light guide pattern 11c.

The controller 220 transmits a position signal of each light guide pattern 11c (specifically, a position signal including an X coordinate of each light guide pattern 11c read out from the pattern storing unit 210) to the first driver 242, and transmits a position signal including a Y coordinate of each light guide pattern 11c to the second driver 244. Also, the controller 220 generates a switching signal for oscillating the laser oscillating unit 230 on the basis of the length information of the light guide pattern 11c read out from the pattern storing unit 210, and transmits the generated switching signal to the laser oscillating unit 230.

The laser oscillating unit 230 outputs a laser beam synchronized with a movement of the header unit 250, on the basis of the switching signal received from the controller 220.

The X-Y drivers 242 and 244 can include the first driver 242 for moving the header unit 250 in horizontal direction 250a along a first guide rail 241, and the second driver 244 for moving the stage 260 in front and rear direction 260a along a second guide rail 243. The first and second drivers 242 and 244 can be realized by a linear motor, for example, but they are not necessarily limited to the linear motor.

The header unit 250 is integrally comprised of a second mirror 251 and a lens 252. The second mirror 251 vertically downwardly reflects a laser beam reflected by a first mirror 231. The lens 252 forms the light guide patterns 11c by concentrating the laser beam reflected by the second mirror 251, on a surface of the light guide panel 11.

The stage 260 moves along the fixed second guide rail 243 in the front and rear direction 260a of the light guide panel 11 by way of the second driver 244, and fixes the light guide panel 11.

A process of forming the light guide patterns using the above-constructed pattern forming apparatus 200 is described below in detail.

Referring to FIG. 2, the controller 220 reads out a position signal of the light guide pattern 11c to be formed in the light guide panel 11 (i.e., both a position signal including an X coordinate of each light guide pattern 11c and a position signal including a Y coordinate of each light guide pattern 11c) from the pattern storing unit 210, and transmits the read-out position signal to the first and second drivers 242 and 244, respectively. Also, the controller 220 generates a switching signal for oscillating the laser oscillating unit 230 on the basis of length information of the light guide pattern 11c read out from the pattern storing unit 210, and transmits the generated switching signal to the laser oscillating unit 230.

After that, on the basis of the switching signal received from the controller 220, the laser oscillating unit 230 outputs a laser beam synchronized with a movement of the header unit 250. Next, the output laser beam is reflected from the first mirror 231 coupled with the first guide rail 241 toward the header unit 250. After that, the laser beam is reflected and concentrated by the second mirror 251 and lens 252 of the header unit 250 to form the light guide pattern 11c in the surface of the light guide panel 11.

Figure 3:
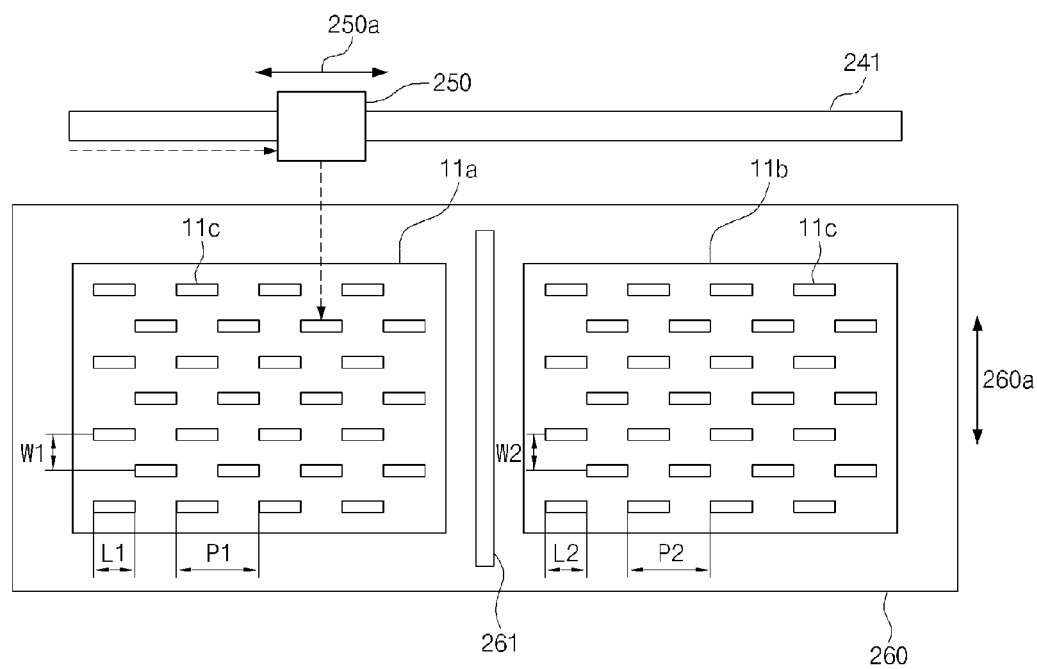
FIG. 3 is a diagram illustrating a dual stage capable of fixing two light guide panels according to an exemplary embodiment of the present invention.

FIG. 3 is a diagram illustrating a dual stage capable of fixing two light guide panels according to an exemplary embodiment of the present invention.

Referring to FIG. 3, the stage 260 can fix two light guide panels (e.g., a first light guide panel 11a and a second light guide panel 11b) at the left and right sides of a separating plate 261, respectively. According to an exemplary embodiment, the number of light guide panels fixed to the stage 260 may be a plural number of '3' or more in addition to '2' illustrated in FIG. 3.

On the other hand, in FIG. 3, light guide patterns 11c formed by reflecting and concentrating light in the header unit 250 are illustrated. The light guide patterns 11c are composed of a plurality of lines. In each line, the light guide patterns 11c of a discontinuous straight line shape are formed. In FIG. 3, reference numeral 'L1' denotes a length of each light guide pattern 11c formed in the first light guide panel 11a, 'P1' denotes a pitch between the light guide patterns 11c of the horizontal direction 250a, and 'W1' denotes an interval between the light guide patterns 11c of the front and rear direction 260a. Also, reference numeral 'L2' denotes a length of each light guide pattern 11c formed in the second light guide panel 11b, 'P2' denotes a pitch between the light guide patterns 11c of the horizontal direction 250a, and 'W2' denotes an interval between the light guide patterns 11c of the front and rear direction 260a. As illustrated in FIG. 3, it can be L1=L2, P1=P2, and W1=W2. According to an exemplary embodiment, the light guide patterns 11c may be formed such that a length of any one light guide panel 11a is constructed longer as given by L1 >L2, P1=P2, and W1=W2.

Figure 4:
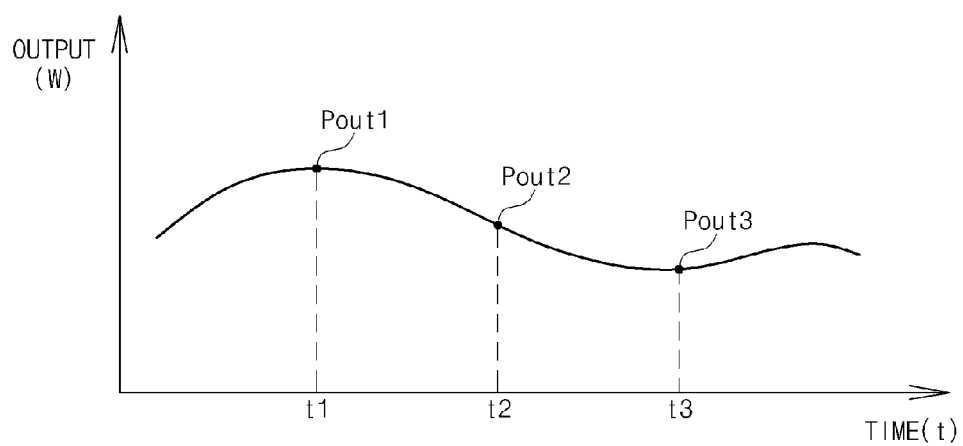
FIG. 4 is a graph illustrating an output characteristic of a laser used to split and form light guide patterns according to an exemplary embodiment of the present invention.
Figure 5:
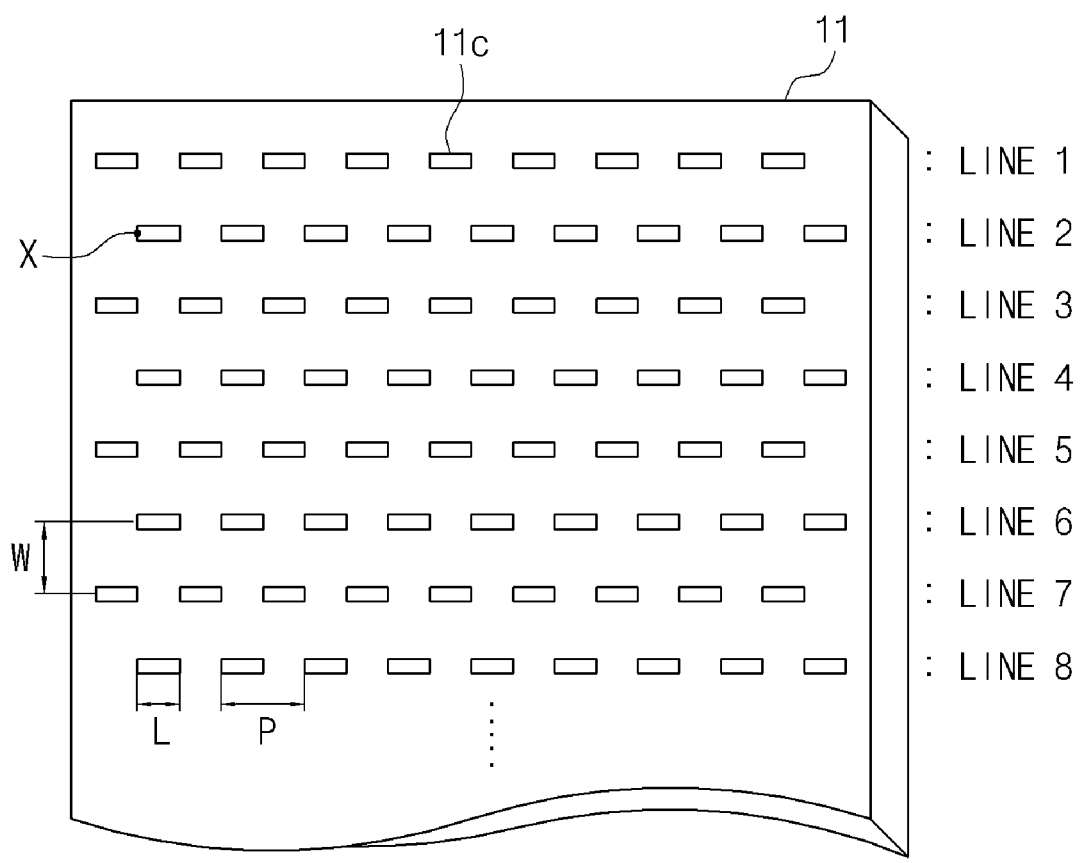
FIG. 5 is a diagram for describing a process of splitting and forming light guide patterns according to an exemplary embodiment of the present invention.

FIG. 4 is a graph illustrating an output characteristic of a laser used to split and form light guide patterns according to an exemplary embodiment of the present invention. FIG. 5 is a diagram for describing a process of splitting and forming a light guide pattern according to an exemplary embodiment of the present invention.

Referring to FIGS. 2 and 4, a laser beam outputted from the laser oscillating unit 230 has output characteristics ($P_{out1}$, $P_{out2}$, and $P_{out3}$) having constant deviations varying depending on time (t1, t2, and t3) as illustrated in FIG. 4. Due to this laser output characteristic, non-uniform light guide patterns 11c are formed in the light guide panel 11. Thus, in order to equalize the laser output characteristic, the present invention splits and forms the light guide patterns 11c through many times. Its method is described below in detail with reference to FIG. 5.

Referring to FIGS. 2 and 5, the stage 260 fixing the light guide panel 11 thereto reciprocates along the second guide rail 243 in the front and rear direction 260a under the control of the controller 220. When the stage 260 moves, the header unit 250 forms the light guide patterns 11c while skipping the line.

According to a first exemplary embodiment, in case that the number of times of reciprocation of the stage 260 is equal to '1', the header unit 250 forms light guide patterns 11c for a light guide pattern line (2N+1(N=0, 1, 2, 3, . . . )) as the stage 260 moves to the front, and forms light guide patterns 11c for a light guide pattern line (2N+2(N=0, 1, 2, 3, . . . )) as the stage 260 returns to the rear.

According to a second exemplary embodiment, in case that the number of times of reciprocation of the stage 260 is equal to '1.5', the header unit 250 forms light guide patterns 11c for a light guide pattern line (3N+1(N=0, 1, 2, 3, . . . )) as the stage 260 moves to the front, forms light guide patterns 11c for a light guide pattern line (3N+2(N=0, 1, 2, 3, . . . )) as the stage 260 returns to the rear, and forms light guide patterns 11c for a light guide pattern line (3N+3(N=0, 1, 2, 3, . . . )) as the stage 260 again moves to the front.

According to a third exemplary embodiment, in case that the number of times of reciprocation of the stage 260 is equal to '2', the header unit 250 forms light guide patterns 11c for a light guide pattern line (4N+1(N=0, 1, 2, 3, . . . )) as the stage 260 moves to the front, forms light guide patterns 11c for a light guide pattern line (4N+2(N=0, 1, 2, 3, . . . )) as the stage 260 returns to the rear, forms light guide patterns 11c for a light guide pattern line (4N+3(N=0, 1, 2, 3, . . . . )) as the stage 260 again moves to the front, and forms light guide patterns 11c for a light guide pattern line (4N+4(N=0, 1, 2, 3, . . . )) as the stage 260 again returns to the rear.

Besides the aforementioned first to third exemplary embodiments, the number of times of splitting and forming may be modified and embodied by those skilled in the art, on the basis of the disclosure of the present invention. Also, it is obvious to those skilled in the art that, unlike the description of the present invention, construction can be such that the light guide patterns 11c are split and formed by moving the header unit 250 instead of the stage 260 in the front and rear direction 260a.

The controller 220 reads out position and length information on each light guide pattern 11c to be formed in the light guide panel 11, from the pattern storing unit 210, to form the light guide patterns 11c. At this time, there occurs an exterior warp phenomenon in which it is seen that the light guide patterns 11c formed in the light guide panel 11 are seemingly curved or warped along their edges due to several main causes. Accordingly, in order to eliminate this exterior warp phenomenon, the present invention intentionally adds a noise.

In detail, the controller 220 varies a start point (X) of formation of the light guide pattern 11c. This is achieved by adding an arbitrary random value of about 5 μm to 100 μm to an X coordinate of a position signal read out from the pattern storing unit 210 and transmitting the X coordinate to the first driver 242, for each of the light guide patterns 11c to be formed in the light guide panel 11. Or, the controller 220 varies a length of a light guide pattern 11c. This is achieved by generating a switching signal, which is an addition of an arbitrary random value of about 5 μm to 100 μm to length information (L) of the light guide pattern 11c read from the pattern storing unit 210 and transmitting the switching signal to the laser oscillating unit 230, for each of the light guide patterns 11c to be formed in the light guide panel 11. By adding an intentional noise as above, the present invention has an effect of eliminating the exterior warp phenomenon.

As described above, by splitting and forming light guide patterns in a light guide panel through many times, the present invention can equalize an output of waving laser, and can secure the uniformity of the light guide patterns manufactured through this.

Also, by fixing a plurality of light guide panels to a stage to form light guide patterns, the present invention can improve the productivity of the light guide patterns.

Also, by adding an intentional noise in the way of varying, by a minute size, a start point and length of each of light guide patterns to be formed, the present invention can eliminate an exterior warp phenomenon occurring in light guide patterns.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for forming a pattern using a laser, the apparatus comprising:
   a pattern storing unit for storing data on light guide patterns of a discontinuous straight line shape to be formed in a light guide panel;
   a controller for reading out position signals of the light guide patterns to be formed in the light guide panel, from the pattern storing unit, and transmitting the read-out position signals to an X-Y driver and simultaneously, transmitting a switching signal, which is generated on the basis of length information of the light guide patterns, to a laser oscillating unit;
   the laser oscillating unit for outputting a laser beam synchronized with a movement of a header unit, on the basis of the switching signal received from the controller;
   the X-Y driver for moving the header unit and a stage, on the basis of the position signals received from the controller;

the header unit moving along a first guide rail in the left and right direction of the light guide panel by way of the X-Y driver, and forming the light guide patterns in the light guide panel by vertically downwardly reflecting and concentrating the laser beam output from the laser oscillating unit; and the stage moving along a fixed second guide rail in the front and rear direction of the light guide panel by way of the X-Y driver, and fixing the light guide panel, wherein the light guide patterns are split and formed through many times by means of reciprocation of the stage.

2. The apparatus of claim 1, wherein the stage is a stage capable of fixing a plurality of light guide panels.

3. The apparatus of claim 1, wherein the controller varies a start point of formation of the light guide pattern, by adding an arbitrary random value of 5 μm to 100 μm to an X coordinate of the position signal read out from the pattern storing unit, for each of the light guide patterns to be formed in the light guide panel.

4. The apparatus of claim 1, wherein the controller varies a length of the light guide pattern, by adding an arbitrary random value of 5 μm to 100 μm to the length information read out from the pattern storing unit, for each of the light guide patterns to be formed in the light guide panel.

5. The apparatus of claim 1, wherein, in case that the number of times of reciprocation is equal to '1', the header unit splits and forms light guide patterns in the way of forming light guide patterns for a light guide pattern line ($2N+1$ ($N=0, 1, 2, 3, \ldots$)) as the stage moves to the front and forming light guide patterns for a light guide pattern line ($2N+2$($N=0, 1, 2, 3, \ldots$)) as the stage returns to the rear.

6. The apparatus of claim 1, wherein, in case that the number of times of reciprocation is equal to '1.5', the header unit splits and forms light guide patterns in the way of forming light guide patterns for a light guide pattern line ($3N+1$ ($N=0, 1, 2, 3, \ldots$)) as the stage moves to the front, forming light guide patterns for a light guide pattern line ($3N+2$($N=0, 1, 2, 3, \ldots$)) as the stage returns to the rear, and forming light guide patterns for a light guide pattern line ($3N+3$($N=0, 1, 2, 3, \ldots$)) as the stage again moves to the front.

7. The apparatus of claim 1, wherein, in case that the number of times of reciprocation is equal to '2', the header unit forms light guide patterns in the way of forming light guide patterns for a light guide pattern line ($4N+1$($N=0, 1, 2, 3, \ldots$)) as the stage moves to the front, forming light guide patterns for a light guide pattern line ($4N+2$($N=0, 1, 2, 3, \ldots$)) as the stage returns to the rear, form light guide patterns for a light guide pattern line ($4N+3$($N=0, 1, 2, 3, \ldots$)) as the stage again moves to the front, and forming light guide patterns for a light guide pattern line ($4N+4$($N=0, 1, 2, 3, \ldots$)) as the stage again returns to the rear.

8. The apparatus of claim 2, wherein the controller varies a start point of formation of the light guide pattern, by adding an arbitrary random value of 5 μm to 100 μm to an X coordinate of the position signal read out from the pattern storing unit, for each of the light guide patterns to be formed in the light guide panel.

9. The apparatus of claim 2, wherein the controller varies a length of the light guide pattern, by adding an arbitrary random value of 5 μm to 100 μm to the length information read out from the pattern storing unit, for each of the light guide patterns to be formed in the light guide panel.

10. The apparatus of claim 2, wherein, in case that the number of times of reciprocation is equal to '1', the header unit splits and forms light guide patterns in the way of forming light guide patterns for a light guide pattern line ($2N+1$ ($N=0, 1, 2, 3, \ldots$)) as the stage moves to the front and forming light guide patterns for a light guide pattern line ($2N+2$($N=0, 1, 2, 3, \ldots$)) as the stage returns to the rear.

11. The apparatus of claim 2, wherein, in case that the number of times of reciprocation is equal to '1.5', the header unit splits and forms light guide patterns in the way of forming light guide patterns for a light guide pattern line ($3N+1$ ($N=0, 1, 2, 3, \ldots$)) as the stage moves to the front, forming light guide patterns for a light guide pattern line ($3N+2$($N=0, 1, 2, 3, \ldots$)) as the stage returns to the rear, and forming light guide patterns for a light guide pattern line ($3N+3$($N=0, 1, 2, 3, \ldots$)) as the stage again moves to the front.

12. The apparatus of claim 2, wherein, in case that the number of times of reciprocation is equal to '2', the header unit forms light guide patterns in the way of forming light guide patterns for a light guide pattern line ($4N+1$($N=0, 1, 2, 3, \ldots$)) as the stage moves to the front, forming light guide patterns for a light guide pattern line ($4N+2$($N=0, 1, 2, 3, \ldots$)) as the stage returns to the rear, form light guide patterns for a light guide pattern line ($4N+3$($N=0, 1, 2, 3, \ldots$)) as the stage again moves to the front, and forming light guide patterns for a light guide pattern line ($4N+4$($N=0, 1, 2, 3, \ldots$)) as the stage again returns to the rear.

* * * * *